C. F. SULTEMEYER.
METHOD OF MAKING ANTIFRICTION BEARINGS.
APPLICATION FILED FEB. 7, 1911.
1,048,758.
Patented Dec. 31, 1912.
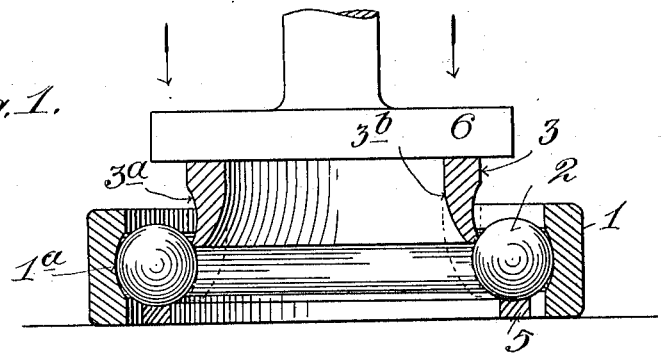
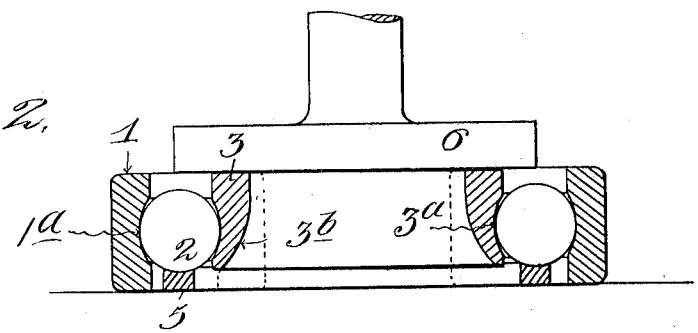
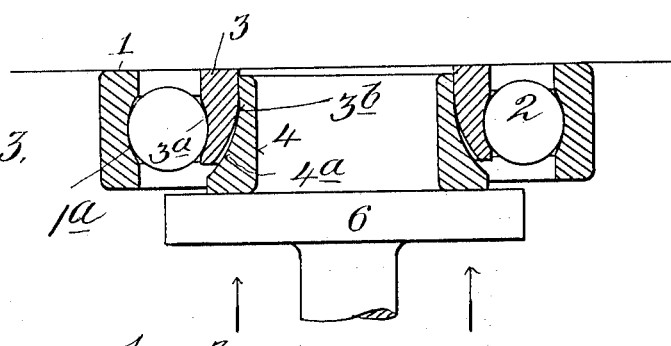
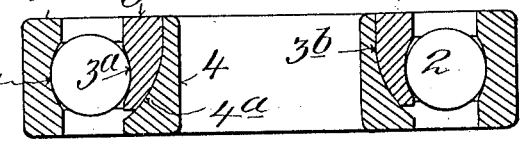
Witnesses:
Inventor
Chas F. Sultemeyer
By his Attorney

UNITED STATES PATENT OFFICE.

CHARLES F. SULTEMEYER, OF NEW YORK, N. Y.

METHOD OF MAKING ANTIFRICTION-BEARINGS.

1,048,758.  Specification of Letters Patent.  Patented Dec. 31, 1912.

Application filed February 7, 1911. Serial No. 607,194.

*To all whom it may concern:*

Be it known that I, CHARLES F. SULTE-MEYER, a citizen of the United States, and resident of New York city, borough of Bronx, in the county of New York and State of New York, have invented certain new and useful Improvements in Methods of Making Antifriction-Bearings, of which the following is a specification.

Radial bearings, comprising inner and outer concentric rings or members with balls interposed, are assembled, as known to me, by the eccentric displacement of the two concentric rings, permitting a limited number of balls to be inserted between them; also by means of a notch, either straight or oblique, provided in either one or both rings, which permits the balls to be slipped or pressed through into the concentric raceways, or the rings are provided with shallow raceways and the outer ring is expanded by heat to permit the balls to be pressed between the rings, and, also, the inner surface of the outer ring or the outer surface of the inner ring may be provided with an eccentric frustro-conical bevel allowing it to be pressed over the balls into proper position. The various methods above mentioned have certain defects, viz: there are either too few balls in the bearing, or the continuity of the raceways is interrupted or destroyed, offering obstruction to the balls in their circuit, or the raceways are too shallow, offering little or no resistance to side or end thrust.

It is the object of my invention to overcome the above named defects or objections, and enable the ready placing of balls between the outer and inner concentric rings or members of a radial bearing, whereby the raceway will not be interrupted, may be of considerable depth, and the full complement of balls may be inserted and retained between the rings.

In carrying out my invention I provide outer and inner concentric rings or races having opposed annular grooves or raceways to receive the balls, one of the rings or races preferably being made of two pieces fitting one within another, one of which is provided on one surface with a continuous and uninterrupted raceway of desired depth, while on the other side it is beveled or rounded and seated in a corresponding bevel in the companion ring, such two parts being so arranged that they may be slipped together with a light fit or may be forcibly pressed into position, all whereby the balls may be first set in the raceway of the outer ring and the inner bearing ring may be forced into place within the circular row of balls.

My invention will be more fully understood by reference to the accompanying drawings forming part hereof, wherein—

Figure 1 is a central sectional view illustrating one of the first steps in carrying out my invention; Fig. 2 is a similar view illustrating the next step; Fig. 3 is a similar view illustrating the step of applying the two inner ring members together, and Fig. 4 is a sectional view of the completed bearing.

The outer ring or race 1 is provided with an inner raceway $1^a$ adapted to receive the balls 2 in usual manner, and the inner ring or race 3 is provided with a peripheral raceway $3^a$ to fit the balls. The dimensions are such that said races must be pressed in place between the balls. Within race 3 is a supporting ring 4 provided with a seat $4^a$ to fit the seat $3^b$ at the wall of the bore of the race or ring 3. The seats $3^b$ and $4^a$ are shown correspondingly oppositely curved and fit together with required tightness so that the load coming upon race 3 will be borne by ring 4.

Referring to Fig. 1, the ring 1 will be placed upon a suitable support, such as a metal plate, and a supporting ring 5, having a suitable annular groove in its upper surface to receive the balls, will be placed upon such support within ring 1 under the balls, so that the latter will fit properly within the raceway $1^a$. The race 3 is then placed in position with its edge against the balls and by pressure from a suitable tool 6 said race will be forced between balls 2, the latter being retained in position by the parts 1, 5, the relatively thin marginal or edge portion of race 3 springing sufficiently to permit the same to be forced past the balls into the position shown in Fig. 2. While in Fig. 1 I have illustrated the race 3 as being fitted in parallel relation with respect to ring 1, it will be understood that the same may be presented against the balls in an angular position if preferred.

The parts 1, 3 with the interposed balls fitted together as stated, are then placed upon the plate or table, and the ring 4 is placed with its thinner marginal portion within the bore of race or ring 3, and the tool 6 is then pressed upon ring 4, thus forcing the same into the bore in race 3, as illustrated in Fig. 3, and when the seats 3ᵇ and 4ᵃ of the race 3 and ring 4 are finally forced together the bearing will be completed as illustrated in Fig. 4. The parts 3, 4, thus united possess a desired degree of resiliency with respect to each other.

By the method set forth it will be understood that the raceways may be of considerable depth to provide for side or end thrust, and that the raceways are continuous and uninterrupted, there being no requirement for notches in the material leading to the raceways, or other distortions of the continuity of the raceways or the material of the rings and races, to permit the assembling of the parts, and that the full complement of balls designed and adapted to fit within the bearing may be accommodated.

Having now described my invention what I claim is:—

1. The herein described method of assembling radial bearings consisting of placing a series of balls within an inner peripheral raceway formed in a bearing ring, supporting said balls against lateral displacement from said raceway, and forcing within said balls a race or ring having a yielding edge, and then forcing within the yielding edge of the last named race or ring an additional ring which has wedging engagement with said race or ring to hold said race or ring in distended position.

2. The method of assembling radial bearings consisting in placing a series of balls within an inner raceway in a bearing ring, forcing a race within said balls and against the same in a position concentric with said ring, and then forcing a ring within said race from the side opposite to which the ring was forced between the balls.

Signed at Detroit in the county of Wayne and State of Michigan this second day of February A. D. 1911.

CHARLES F. SULTEMEYER.

Witnesses:
 MARIE MUGAN,
 F. EARL LONG.

---

Copies of this patent may be obtained for five cents each, by addressing the "Commissioner of Patents, Washington, D. C."